US012474664B2

United States Patent

Yoshimura et al.

(12) United States Patent
(10) Patent No.: US 12,474,664 B2
(45) Date of Patent: Nov. 18, 2025

(54) IMAGE FORMING APPARATUS

(71) Applicant: CANON KABUSHIKI KAISHA, Tokyo (JP)

(72) Inventors: Akira Yoshimura, Shizuoka (JP); Shigeru Hoashi, Shizuoka (JP); Yuichiro Inaba, Kanagawa (JP); Masatoshi Takiguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/782,745

(22) Filed: Jul. 24, 2024

(65) Prior Publication Data

US 2025/0036067 A1 Jan. 30, 2025

(30) Foreign Application Priority Data

Jul. 27, 2023 (JP) ................................ 2023-122711
Sep. 22, 2023 (JP) ................................ 2023-159238

(51) Int. Cl.
*G03G 21/16* (2006.01)
*B65H 31/02* (2006.01)
*G03G 15/00* (2006.01)

(52) U.S. Cl.
CPC ......... *G03G 21/1609* (2013.01); *B65H 31/02* (2013.01); *G03G 15/6529* (2013.01); *G03G 15/757* (2013.01); *G03G 21/1619* (2013.01)

(58) Field of Classification Search
CPC ........... G03G 21/1609; G03G 15/6529; G03G 15/757; G03G 21/1619; G03G 21/1604; B65H 31/02
See application file for complete search history.

(56) References Cited

U.S. PATENT DOCUMENTS

2011/0156336 A1* 6/2011 Agata .................... B65H 5/062 271/3.19
2013/0082432 A1* 4/2013 Tsuji ...................... B65H 31/02 270/58.17

FOREIGN PATENT DOCUMENTS

JP 2003298790 A 10/2003
JP 2008209744 A 9/2008
JP 2016020932 A 2/2016
JP 2016045375 A 4/2016

* cited by examiner

*Primary Examiner* — Sandra Brase
(74) *Attorney, Agent, or Firm* — Canon U.S.A., Inc. IP Division

(57) ABSTRACT

An image forming apparatus includes a housing configured to accommodate an image forming unit that forms an image on a recording material, a discharge unit configured to discharge the recording material to the outside of the housing, and a motor disposed inside of the housing and configured to drive the image forming unit. The housing includes a stacking unit on which the recording material discharged by the discharge unit is stacked and a wall surface provided at an end of the stacking unit in a width direction that is perpendicular to a vertical direction and a discharge direction of the discharge unit, and the wall surface extends upward beyond the stacking unit. The motor is disposed at a position that overlaps the wall surface as viewed in the width direction.

14 Claims, 11 Drawing Sheets

IMAGE FORMING APPARATUS

BACKGROUND OF THE DISCLOSURE

Field of the Disclosure

The present disclosure relates to an image forming apparatus that forms an image on a recording material.

Description of the Related Art

Japanese Patent Laid-Open No. 2016-45375 describes an image forming apparatus including a motor mounted on a side plate of the image forming apparatus and a gear train that transmits the driving force of a motor to a photosensitive drum.

SUMMARY OF THE DISCLOSURE

There is a need for determining a motor mounting location that achieves more size reduction of an image forming apparatus.

Accordingly, the present disclosure provides an image forming apparatus that can be reduced in size. According to an aspect of the present disclosure, an image forming apparatus includes a housing configured to accommodate an image forming unit that forms an image on a recording material, a discharge unit including a roller and configured to discharge the recording material to the outside of the housing, and a motor disposed inside of the housing and configured to drive the image forming unit, wherein the housing includes a stacking unit on which the recording material discharged by the discharge unit is stacked and a wall surface provided at an end of the stacking unit in a width direction that is perpendicular to both a vertical direction and a discharge direction of the discharge unit, and the wall surface extends upward beyond the stacking unit, and wherein the motor is disposed at a position that overlaps the wall surface as viewed in the width direction.

Further features of the present disclosure will become apparent from the following description of exemplary embodiments with reference to the attached drawings.

DESCRIPTION OF THE EMBODIMENTS

Figure 1:
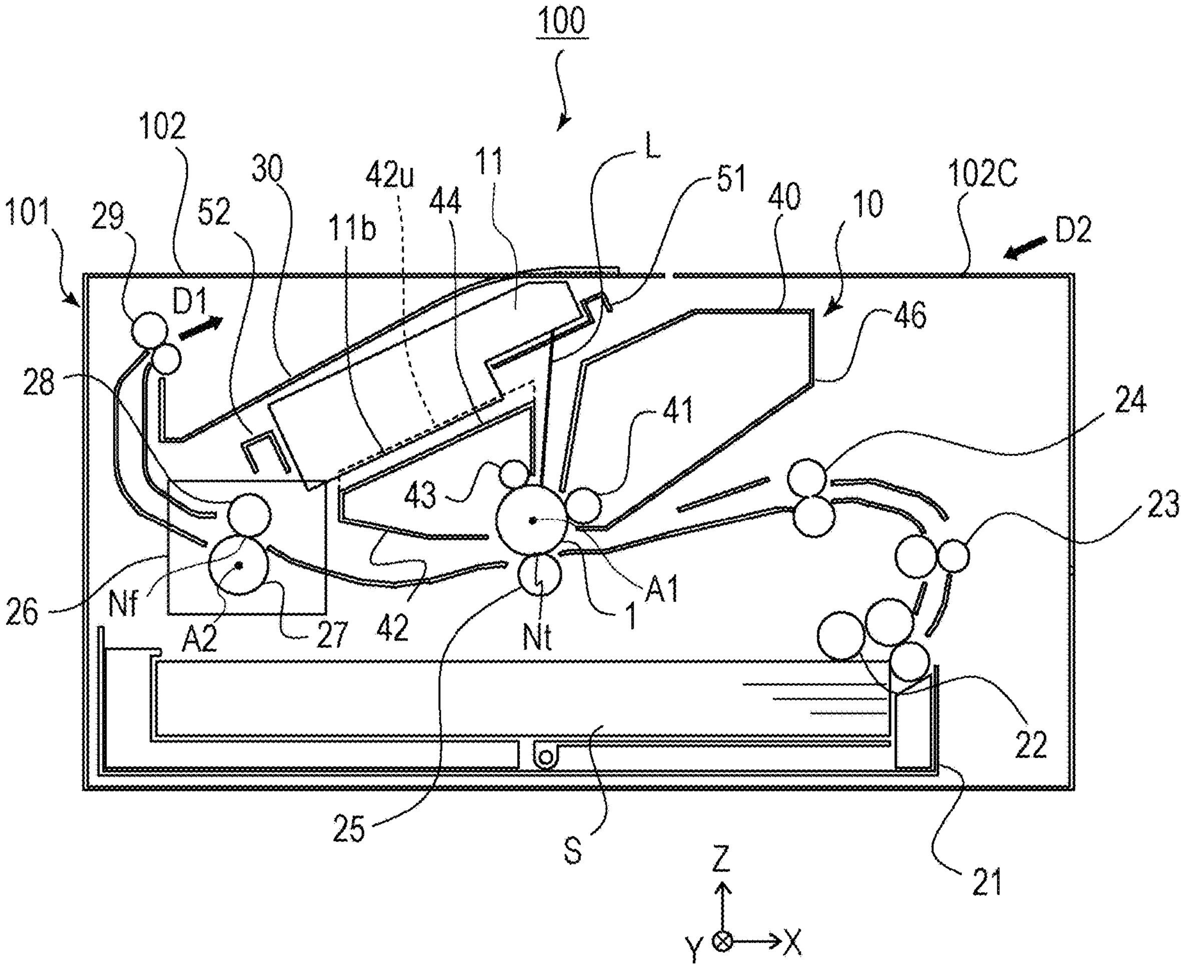
FIG. 1 is a schematic illustration of an image forming apparatus according to a first embodiment.

Exemplary embodiments of the present disclosure are described below with reference to the accompanying drawings.

In descriptions and drawings below, the vertical direction (the direction of gravitational force) when an image forming apparatus is installed on a horizontal plane is defined as the Z-axis direction. The direction of the rotational axis of a photosensitive drum (an image bearing member) of the image forming apparatus is defined as the Y-axis direction, and the direction that intersects both the Z-axis and X-axis directions is defined as the X-axis direction.

The x-, y-, and z-axis directions are preferably perpendicular to each other.

The positive and negative directions along each of the coordinate axes are denoted by attaching a + (plus) or − (minus) sign thereto, respectively, as necessary. For example, the positive direction of the X-axis (the direction denoted by arrow X in the drawings) indicates the +X side, and the negative direction of the X-axis (the opposite side of arrow X) indicates the −X side.

First Embodiment

Figure 2:
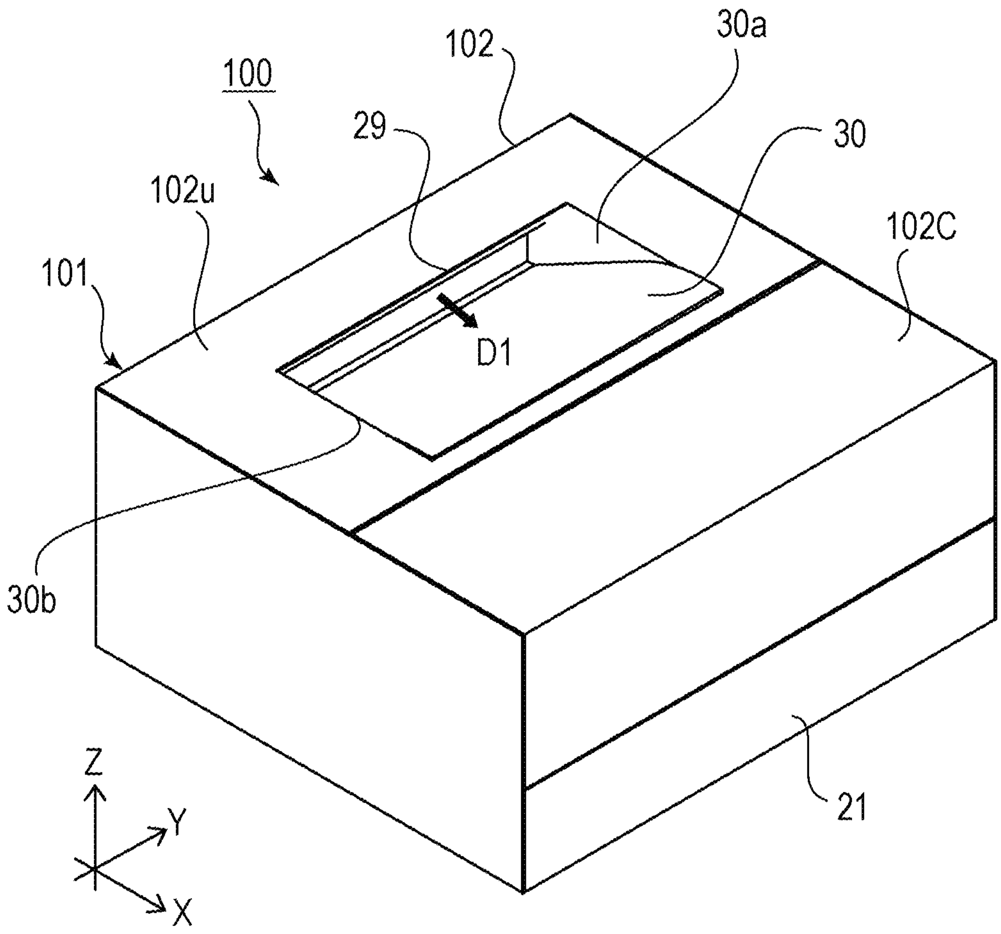
FIG. 2 is a perspective view of the image forming apparatus according to the first embodiment.

FIG. 1 is a schematic illustration of an image forming apparatus 100 according to the first embodiment. FIG. 1 illustrates a cross section of the image forming apparatus 100 cut by the X-Z plane. FIG. 2 is a perspective view of the image forming apparatus 100.

The image forming apparatus 100 forms an image on a sheet S, which is a recording material (a recording medium), on the basis of image information received from an external information processing apparatus, for example. The image forming apparatus 100 is an electrophotographic monochrome image forming apparatus, which is a laser beam printer. A variety of sheet materials of different sizes and different materials can be used as the sheet S. Examples of the sheet S include paper, such as, plain paper or thick paper, surface-treated sheet material, such as coated paper, specially shaped sheet material, such as an envelope or index paper, a plastic film, and cloth.

Image Forming Apparatus

As illustrated in FIG. 1, the image forming apparatus 100 includes an apparatus body 101, which is the main body of the image forming apparatus, a process cartridge 10 that is removable from the apparatus body 101, and a sheet tray 21. The apparatus body 101 includes a housing 102 and constituent elements attached to the housing 102. The housing 102 includes at least one frame member that forms the frame of the image forming apparatus 100 (the frame of the apparatus body 101) and at least one cover member (an exterior member) that forms an exterior surface of the image forming apparatus 100 (an exterior surface of the apparatus body 101).

The process cartridge 10 is an example of an image forming unit that forms an image on a recording material.

The process cartridge 10 is a process unit for forming an image on a recording material through an electrophotographic process. The process cartridge 10 according to the present embodiment is removable from the housing 102. That is, the housing 102 can accommodate the process cartridge 10 serving as an image forming unit for forming an image on a recording material.

The housing 102 includes an opening portion and an opening and closing cover 102C serving as an opening and closing member that can open and close the opening portion. The process cartridge 10 can be removably mounted to the housing 102 through the opening portion with the opening and closing cover 102C open.

As illustrated in FIG. 1, the apparatus body 101 includes a feeding unit 22, conveyance roller pairs 23 and 24, a transfer roller 25, a fixing device 26, and a discharge roller pair 29. These constituent elements are attached to the housing 102. In addition, a discharge tray 30 and a side wall 30*a* (refer also to FIG. 2) are provided in the upper portion of the apparatus body 101 (an upper portion of the housing 102). The discharge tray 30 and the side wall 30*a* are part of the housing 102.

The discharge roller pair 29 is an example of a discharge unit that discharges the sheet S from the inside to the outside of the apparatus body 101 (from the inside to the outside of the housing 102). The discharge roller pair 29 according to the present embodiment discharges the sheet S toward a discharge direction D1 that intersects both the Y-axis direction and the Z-axis direction. The housing 102 has a discharge port, which is an opening that allows the sheet S discharged by the discharge roller pair 29 to pass therethrough.

In the description below, the downstream side in the discharge direction D1 (+X side in the X-axis direction) is the “front side” of the image forming apparatus 100, and the opposite side (−X side) is the rear side of the image forming apparatus 100. When the image forming apparatus 100 is viewed from the front side (+X side), the right side (+Y side in the Y-axis direction) is the “right side” of the image forming apparatus 100, and the opposite side (−Y side) is the “left side” of the image forming apparatus 100.

The process cartridge 10 is formed by assembling, into a unit, a photosensitive drum 1 that serves as an image bearing member and at least one of process units that act on the photosensitive drum 1 to perform the electrophotographic processes (charging, exposure, development, transfer, cleaning, and pre-exposure). The process cartridge 10 according to the present embodiment includes a charging roller 43 serving as a process unit (a charging unit), a developing unit 40 serving as a process unit (a developing unit), and a cleaning member serving as a process unit (a cleaning unit).

The photosensitive drum 1 is an electrophotographic photosensitive member molded into a cylindrical shape (a drum shape). The developing unit 40 includes a developing roller 41 that bears toner serving as a developing agent and that supplies the toner to the photosensitive drum 1 and a development frame 46 (a developing container) that supports the developing roller 41. A toner storage portion (a toner storage chamber) that stores toner is provided inside of the development frame 46. The process cartridge 10 further includes a cleaning frame 42 that supports the photosensitive drum 1, the charging roller 43, and the cleaning member.

Roughly speaking, the process cartridge 10 is divided into a photosensitive member unit that includes the photosensitive drum 1, the charging roller 43, the cleaning member, and the cleaning frame 42 and the developing unit 40. The cleaning frame 42 is the frame of the photosensitive member unit. A space (an exposure opening) that allows a laser beam L from a laser scanner 11 to pass therethrough is formed between the cleaning frame 42 and the development frame 46. The cleaning frame 42 and the development frame 46 are connected to each other via side covers 10*a* and 10*b* (FIG. 4A) provided at both ends of the process cartridge 10.

The sheet tray 21 has a stacking region in which sheets S are stacked. The sheet tray 21 is a storage section (a storage, a sheet cassette) for storing the sheets S. The sheet tray 21 is disposed in the lower portion of the apparatus body 101 and is configured to be insertable into and withdrawn from the apparatus body 101 (insertable into and withdrawn from the housing 102). The sheet tray 21 according to the present embodiment is movable in the X-axis direction relative to the apparatus body 101 so as to be pulled out of the apparatus body 101 toward the front side (+X side) of the image forming apparatus 100 and be inserted into the apparatus body 101 toward the rear side (−X side) of the image forming apparatus 100.

The feeding unit 22 is an example of a feeding unit that feeds the sheets S one by one. The feeding unit 22 includes, for example, a feeding roller (a pick-up roller) that feeds the sheet S from the sheet tray 21 and a separation roller pair that separates multiple sheets S into a single sheet S and coveys the sheet S when multiple sheets S are fed by the feeding roller.

The conveyance roller pairs 23 and 24 are both conveyance members that convey the sheet S. The conveyance roller pairs 23 and 24 are disposed in the sheet conveyance path from the feeding unit 22 to a transfer portion Nt (described below).

The laser scanner 11 is an example of a process unit (an exposure unit, an exposure device). When the process cartridge 10 is mounted in the apparatus body 101, the laser scanner 11 is disposed above the process cartridge 10 so as to overlap the process cartridge 10 as viewed in the Z-axis direction. The laser scanner 11 includes an oscillator that emits the laser beam L and an optical system (such as a polygon mirror) that guides the laser beam L to the photosensitive drum 1 and scans the photosensitive drum 1 in the main scanning direction (X-axis direction). Instead of the laser scanner 11, an LED exposure device including light emitting elements (LEDs) arranged in the main scanning direction (X-axis direction) can be used.

According to the present disclosure, the expression “two elements ‘overlap’ as viewed in a predetermined direction” means that when each of the elements is vertically projected onto an imaginary plane perpendicular to the predetermined direction, the projected area of one element overlaps at least partially with the projected area of the other element. The meaning of the expression includes the case where when another element is present between the two elements in the predetermined direction, the two elements overlap in a transparent view, unless otherwise noted.

The transfer roller 25 is an example of a process unit (a transfer unit). When the process cartridge 10 is mounted in the apparatus body 101, the transfer roller 25 is disposed so as to be in contact with the photosensitive drum 1. As a nip portion between the photosensitive drum 1 and the transfer roller 25, the transfer portion Nt is formed where a toner image is transferred onto the sheet S. The transfer roller 25 is an example of a transfer member. For example, a corona discharge transfer member may be used.

The fixing device 26 is a fixing unit that fixes a toner image onto the sheet S. The fixing device 26 is a thermal fixing device (an image heating device) that fixes a toner image onto the sheet S by heating the toner image while conveying the sheet S in a fixing portion Nf.

The fixing device 26 according to the present embodiment is of a film heating type and uses a cylindrical film (a fixing film 28) as a heating member (a fixing member) to heat a toner image. The fixing device 26 includes the fixing film 28, a heater serving as a heating unit to heat the fixing film 28, and a pressure roller 27 serving as a pressure member that forms the fixing portion Nf together with the fixing film 28. The heater is, for example, a ceramic heater with a pattern of a heat generating resistor printed on a ceramic substrate and is disposed in the inner space of the fixing film 28 while being held by a heater holder. The pressure roller 27 is disposed so as to nip the fixing film 28 together with the heater and the heater holder. At least one of a pair consisting of the heater and heater holder and the pressure roller 27 is urged against the other and, thus, pressure (nip pressure) is generated in the fixing portion.

According to the present embodiment, the pressure roller 27 is a driven member that rotates by receiving a driving force from a motor 61 (described below). During image formation, the fixing film 28 receives force from the pressure roller 27 and rotates following the pressure roller 27.

The above-described fixing device 26 is an example of a fixing unit, and a fixing unit having another configuration may be employed. For example, a roller member (a fixing roller) having a high rigidity may be used as the heating member (the fixing member). The heating member (the fixing member) or pressure member may be a belt stretched around a plurality of rollers. The driven member that rotates by receiving a driving force from the motor 61 may be a fixing roller or a roller that drives the belt. The heating unit for heating the heating member (fixing member) may be a halogen lamp that emits radiant heat or a coil unit that causes a conductive layer in the heating member (fixing member) to generate heat by the principle of induction heating.

Image Forming Operation

The image forming operation performed by the image forming apparatus 100 is described below with reference to FIG. 1. The image forming operation is a series of operations performed on the basis of an execution instruction from a user, in which the image forming apparatus 100 conveys the sheets S one by one, forms an image on the sheet S on the basis of image information, and discharges the sheet S onto the discharge tray 30.

In the image forming operation, the sheets S stored in the sheet tray 21 are fed one by one by the feeding unit 22, and the sheet S is conveyed to the transfer portion Nt by the conveyance roller pairs 23 and 24.

The conveyance roller pair 24 immediately before the transfer portion Nt functions as a registration unit that adjusts the conveyance timing of the sheet S to match the timing when a toner image formed on the photosensitive drum 1 reaches the transfer portion Nt.

In the process unit (the process cartridge 10), the photosensitive drum 1 is driven clockwise in FIG. 1. The charging roller 43 uniformly charges a surface of the photosensitive drum 1 to a predetermined polarity and a predetermined potential. The laser scanner 11 emits the laser beam L to expose the photosensitive drum 1 and form an electrostatic latent image corresponding to the image information on the surface of the photosensitive drum 1. The developing roller 41 supplies toner serving as a developing agent to the photosensitive drum 1 to develop the electrostatic latent image into a toner image. The toner image formed on the photosensitive drum 1 is borne on the photosensitive drum 1 and reaches the transfer portion Nt.

The toner image is then transferred from the photosensitive drum 1 to the sheet S in the transfer portion Nt. A foreign material, such as residual transfer toner that remains on the photosensitive drum 1 without being transferred to the sheet S in the transfer portion Nt, is collected by the cleaning member and is stored in the waste toner storage portion inside of the cleaning frame 42.

The sheet S that has passed through the transfer portion Nt is delivered to the fixing device 26. The fixing device 26 heats the toner image on the sheet S with the fixing film 28 heated by the heater, while nipping and conveying the sheet S in the fixing portion Nf. The toner on the sheet S is heated and pressurized to produce an image fixed to the sheet S. The sheet S that has passed through the fixing device 26 is discharged to the outside of the apparatus body 101 (the outside of the housing 102) by the discharge roller pair 29 in the discharge direction D1 and is stacked on the discharge tray 30.

Configuration of Top Surface Portion of Housing

The discharge tray 30 and the side walls 30*a* and 30*b* provided on the top surface portion of the housing 102 are described below with reference to FIG. 2. According to the present embodiment, as illustrated in FIG. 2, the discharge tray 30 and the side walls 30*a* and 30*b* are provided in the top surface portion of the housing 102 (the apparatus body 101).

The discharge tray 30 is a stacking unit on which the sheets S (deliverables) each having, thereon, an image formed by the image forming apparatus 100 are stacked. At least part of the discharge tray 30 is inclined upward toward the downstream side in the discharge direction D1 as viewed in the width direction (Y-axis direction) that is perpendicular to both the vertical direction (the Z-axis direction) and the discharge direction D1 of the discharge roller pairs 29. That is, the discharge tray 30 according to the present embodiment has a slope face inclined downward toward the discharge roller pair 29 relative to a top surface 102*u* (the +Z-side end surface) of the housing 102.

The side wall 30*a* is a wall surface provided at one end (+Y side, right side) of the discharge tray 30 in the width direction (Y-axis direction) and extends upward beyond the discharge tray 30. The side wall 30*b* is a wall surface provided at the other end (−Y side, left side) of the discharge tray 30 in the width direction (Y-axis direction) and extends upward beyond the discharge tray 30. As viewed from above, the side walls 30*a* and 30*b* extend in the discharge direction D1. The upper end of each of the side walls 30*a* and 30*b* is connected to the top surface 102*u* of the housing 102.

The side walls 30*a* and 30*b* reduce the movement in the width direction (Y-axis direction) of the sheets S discharged onto the discharge tray 30 and, thus, reduce disruption of alignment of the sheets S. The distance between the side walls 30*a* and 30*b* in the width direction (Y-axis direction) is set slightly greater than the size in the width direction (Y-axis direction) of the sheet S having the largest size among a variety of types of sheets S on which the image forming apparatus 100 can form an image.

Frame Configuration of Housing

Figure 3:
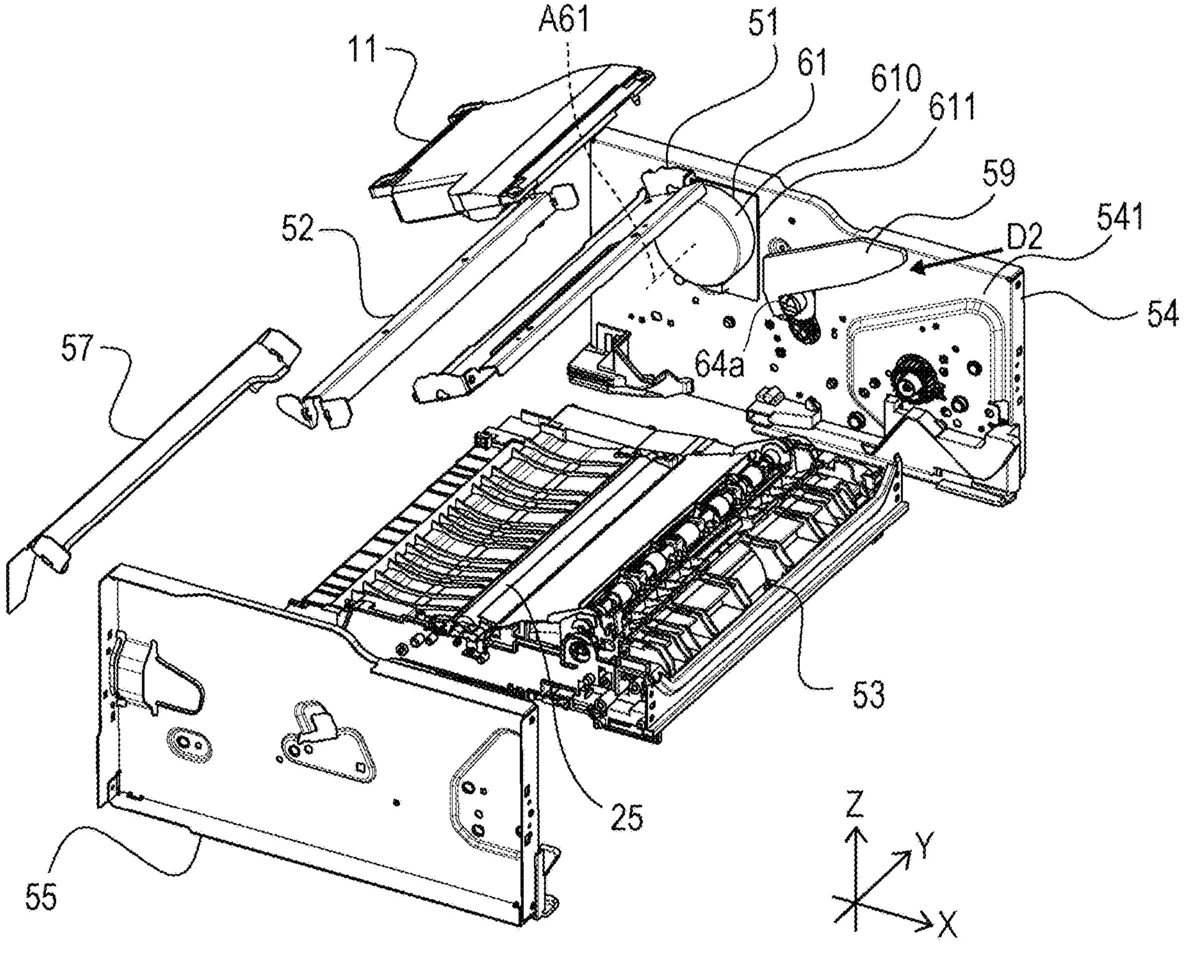
FIG. 3 is an exploded view of a housing frame according to the first embodiment.

The frame configuration of the housing 102 is described below. FIG. 3 is an exploded view of part of the apparatus body 101. More specifically, FIG. 3 illustrates the frame members (51, 52, 53, 54, 55, 57) of the housing 102 of the apparatus body 101, the motor 61, the laser scanner 11, and a guide member 59. Each of the frame members is made from a metal plate, such as a stainless-steel plate.

The housing 102 according to the present embodiment includes a front scanner stay 51, a rear scanner stay 52, a transfer conveyance frame 53, the side plates 54 and 55, and a rear stay 57. The frame members (51, 52, 53, 54, 55, 57) constitute a frame having a substantially rectangular parallelepiped shape. In addition, the frame and exterior members (cover members) that cover the frame constitute the housing 102. A mounting space (mounting section) in which the process cartridge 10 is mounted is formed inside of the frame.

The side plates 54 and 55 are a pair of plate-shaped frame members that face each other in the width direction (Y-axis direction) of the image forming apparatus 100 and intersect the width direction (Y-axis direction). The front scanner stay 51, the rear scanner stay 52, the transfer conveyance frame 53, and the rear stay 57 each extend in the width direction (Y-axis direction) and are connected to each of the side plates 54 and 55 that form the pair. The side plate 54 is an example of a first side plate, and the side plate 55 is an example of a second side plate. The front scanner stay 51 is an example of a first frame, and the rear scanner stay 52 is an example of a second frame.

The front scanner stay 51 and the rear scanner stay 52 hold the laser scanner 11.

At least one of the front scanner stay 51 and the rear scanner stay 52 may be disposed above the process cartridge 10 (FIG. 1) when the process cartridge 10 is mounted in the apparatus body 101.

The front scanner stay 51 is located on the more front side (+X side) than the rear scanner stay 52. The front scanner stay 51 holds the front portion of the laser scanner 11, and the rear scanner stay 52 holds the rear portion of the laser scanner 11. Instead of a configuration in which the laser scanner 11 is held by the two frame members (the front scanner stay 51 and the rear scanner stay 52), the laser scanner 11 can be held by a single plate-shaped frame member.

The transfer conveyance frame 53 holds the transfer roller 25 and includes one or more guide sections for forming the sheet conveyance path in the apparatus body 101. The transfer conveyance frame 53 is disposed above the sheet tray 21 and below the process cartridge 10 in the Z-axis direction when the process cartridge 10 is mounted in the apparatus body 101.

The rear stay 57 is disposed at the rear side (−X side) end of the apparatus body 101. The rear stay 57 is connected to the rear side (−X side) end surface of each of the side plates 54 and 55.

Figure 5:
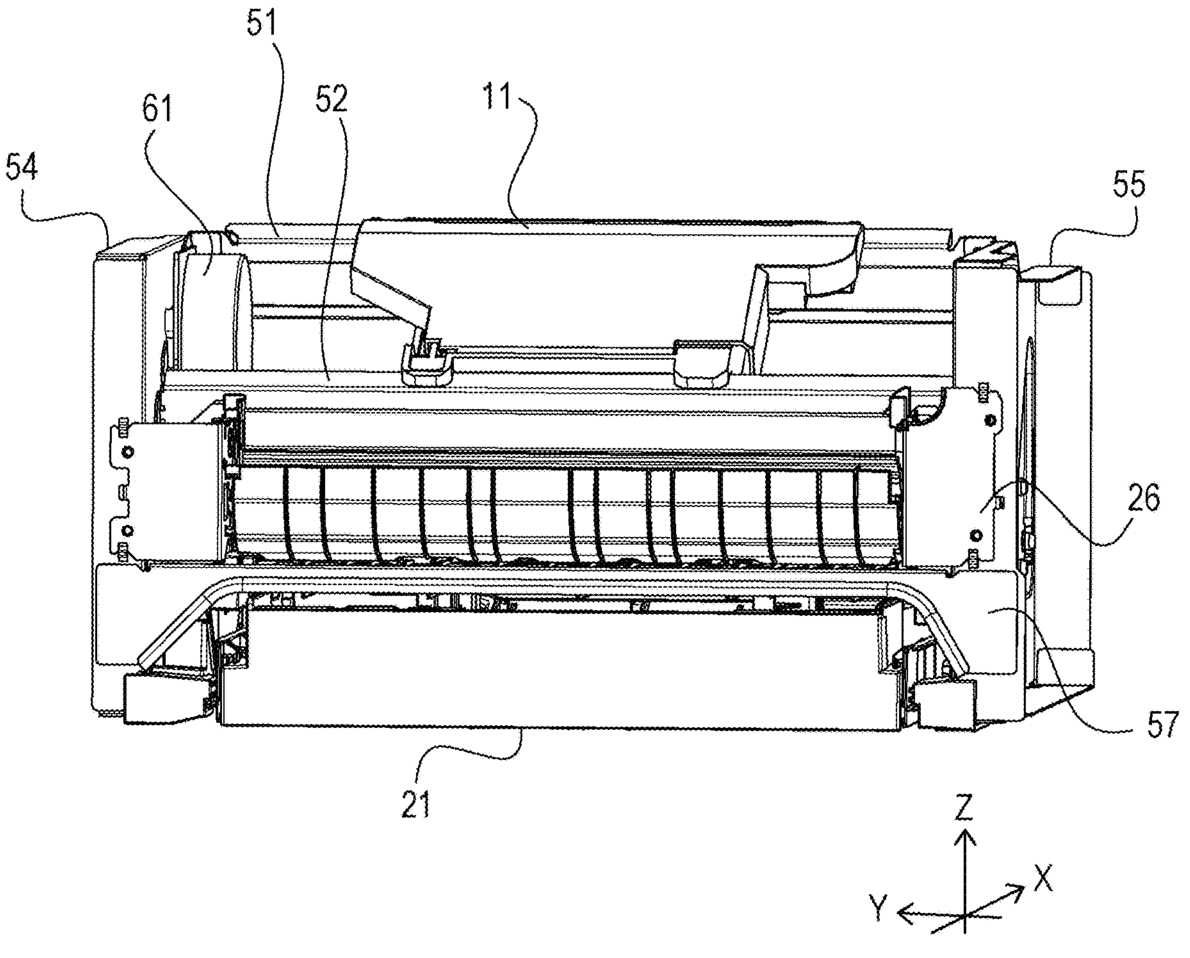
FIG. 5 illustrates the motor according to the first embodiment.

As illustrated in FIG. 5, the rear stay 57 is disposed below the fixing device 26 and above the sheet tray 21 in the Z-axis direction.

According to the present embodiment, the frame member that holds the laser scanner 11 is divided into two parts, that is, the front scanner stay 51 and the rear scanner stay 52, as described below. By providing the rear stay 57 that connects the two side plates 54 and 55 on the rear side (−X side) of the apparatus body 101, the strength of the rear side (−X side) of the apparatus body 101 can be increased in the configuration in which a frame member that holds the laser scanner 11 is divided into two. If sufficient strength is ensured according to the specific configuration of the image forming apparatus 100, a configuration not including the rear stay 57 can be employed.

According to the present embodiment, the front scanner stay 51 and the rear scanner stay 52 that hold the laser scanner 11 are disposed apart from each other in the X-axis direction. That is, according to the present embodiment, the laser scanner 11 (the exposure device) is disposed between two frame members (51, 52) that are disposed apart from each other in the front-rear direction (X-axis direction) of the image forming apparatus 100. A bottom surface portion of the laser scanner 11 has a protruded portion 11*b* (FIG. 1) that protrudes, through a space between the front scanner stay 51 and the rear scanner stay 52, downward beyond the top surface (a support surface that supports the laser scanner 11) of each of the front scanner stay 51 and the rear scanner stay 52.

Figure 4A:
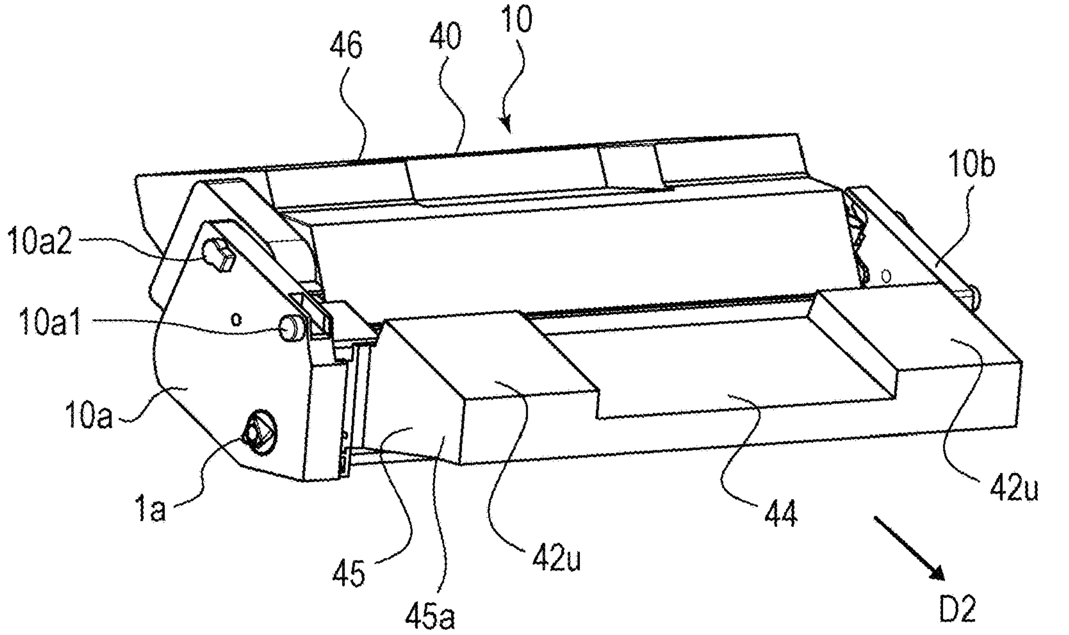
FIG. 4A is a perspective view of a cartridge according to the first embodiment.
Figure 4B:
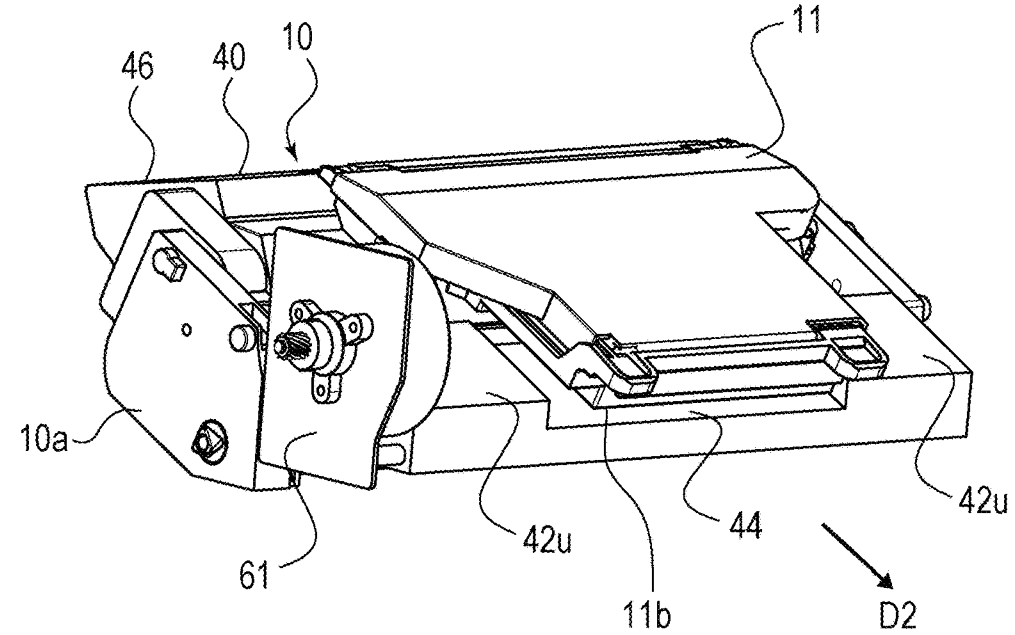
FIG. 4B illustrates a motor according to the first embodiment.

The relationship between the protruded portion 11*b* of the laser scanner 11 and the process cartridge 10 is described below with reference to FIGS. 4A and 4B. FIG. 4A is a perspective view of the process cartridge 10. FIG. 4B is a perspective view illustrating the positional relationship among the process cartridge 10, the laser scanner 11, and the motor 61 (described below) when the process cartridge 10 is mounted in the apparatus body 101.

As illustrated in FIG. 4A, the top surface portion of the process cartridge 10 has a recess 44 that is recessed downward at a location facing the protruded portion 11*b* of the laser scanner 11.

According to the present embodiment, the recess 44 is provided on the top surface portion of the cleaning frame 42. The recess 44 has a predetermined width in the Y-axis direction and is in the form of a shallow groove extending in a mounting direction D2 in which the process cartridge 10 is mounted to the apparatus body 101.

The above-described predetermined width is greater than the width in the Y-axis direction of the protruded portion 11*b* of the laser scanner 11 (FIG. 4B). When the process cartridge 10 is mounted in the apparatus body 101, the recess 44 directly faces the protruded portion 11*b* of the laser scanner 11 without any other member in between. By providing the recess 44 in the process cartridge 10, contact between the process cartridge 10 and the laser scanner 11 can be prevented even if the clearance between the process cartridge 10 and the laser scanner 11 is reduced and, thus, the image forming apparatus 100 can be more reduced in size.

The protruded portion 11*b* of the laser scanner 11 may intrude into the recess 44 of the process cartridge 10. That is, as viewed in the Y-axis direction (FIG. 1), at least part of the protruded portion 11*b* of the laser scanner 11 may be located below the top surface 42*u* of the cleaning frame 42. However, even in the positional relationship where the protruded portion 11*b* does not intrude into the recess 44, the advantage of size reduction due to the reduced clearance can still be obtained.

The mounting direction D2 of the process cartridge 10 is the direction of movement of the process cartridge 10 when the process cartridge 10 is inserted toward a predetermined mounting position (the position where the image forming operation is performed) in the apparatus body 101. The apparatus body 101 includes the guide member 59 (FIG. 3) that guides the movement of the process cartridge 10. The guide member 59 is provided on the inner side of the side plate 54. Protruding portions 10*al* and 10*a*2 (FIG. 4A) provided on the side cover 10*a* of the process cartridge 10 slide on the top surface of the guide member 59, thus regulating the movement of the process cartridge 10 in the mounting direction D2. In addition, sliding of the protruding portions 10*al* and 10*a*2 on the top surface of the guide member 59 regulates the movement of the process cartridge 10 that is being removed in the opposite direction of the mounting direction D2.

Motor

The motor 61 included in the image forming apparatus 100 is described below. As illustrated in FIG. 3, the motor 61 serving as a drive source is disposed in the housing 102 of the image forming apparatus 100. That is, the image forming apparatus 100 includes the motor 61. The motor 61 can rotatingly drive the photosensitive drum 1 of the process cartridge 10 mounted in the apparatus body 101.

The motor 61 can drive a plurality of drive targets, including the photosensitive drum 1. The motor 61 may be the only motor provided in the image forming apparatus 100. The motor 61 according to the present embodiment can drive the photosensitive drum 1, the pressure roller 27 of the fixing device 26, the feeding unit 22, the conveyance roller pairs 23 and 24, and the discharge roller pair 29. The motor 61 may further drive another drive target in accordance with the particular configuration of the image forming apparatus 100. For example, if the image forming apparatus 100 supports double-sided printing and includes a reversing roller pair for reversing the sheet S and a conveyance path and a conveyance roller pair (re-feeding roller pair) for conveying the reversed sheet S back toward the transfer portion Nt, the motor 61 may drive these roller pairs.

The motor 61 includes a motor body 610 and a mounting base 611 (FIG. 3). The motor body 610 includes a stator that does not rotate relative to the mounting base 611, a rotor that is rotatable relative to the stator, and a cover member that covers the stator and rotor and that forms an accommodation space for the stator and rotor together with the mounting base 611. The rotational axis of the rotor is a central axis A61 of the motor 61. The mounting base 611 is a plate-shaped member used to mount the motor 61 to the housing 102. The mounting base 611 includes a circuit and a connector 612 (FIG. 6) that transmits power and commands to drive the motor body 610.

As illustrated in FIG. 3, the motor 61 according to the present embodiment is mounted on the side plate 54. The motor 61 is mounted on an inner surface 541 of the side plate 54 in the width direction (Y-axis direction). That is, the motor 61 is disposed on the inner side of the side plate 54 in the width direction (Y-axis direction). In other words, according to the present embodiment, like the process cartridge 10, the laser scanner 11, and the sheet conveyance path in the apparatus body 101, the motor 61 is disposed in a region between the two side plates 54 and 55 in the width direction (Y-axis direction).

The expression "the motor 61 is disposed on the inner side of the side plate 54 in the width direction (Y-axis direction)" means that at least the motor body 610 is located on the same side of the mounting surface of the side plate 54 for the motor 61 as the side plate 55, which is the other of the two side plates, in the width direction (Y-axis direction). As described below, according to the present embodiment, a pinion gear 61*a* (FIG. 8) that is the output gear of the motor 61 may protrude outward from the side plate 54 in the width direction (Y-axis direction).

Figure 7:
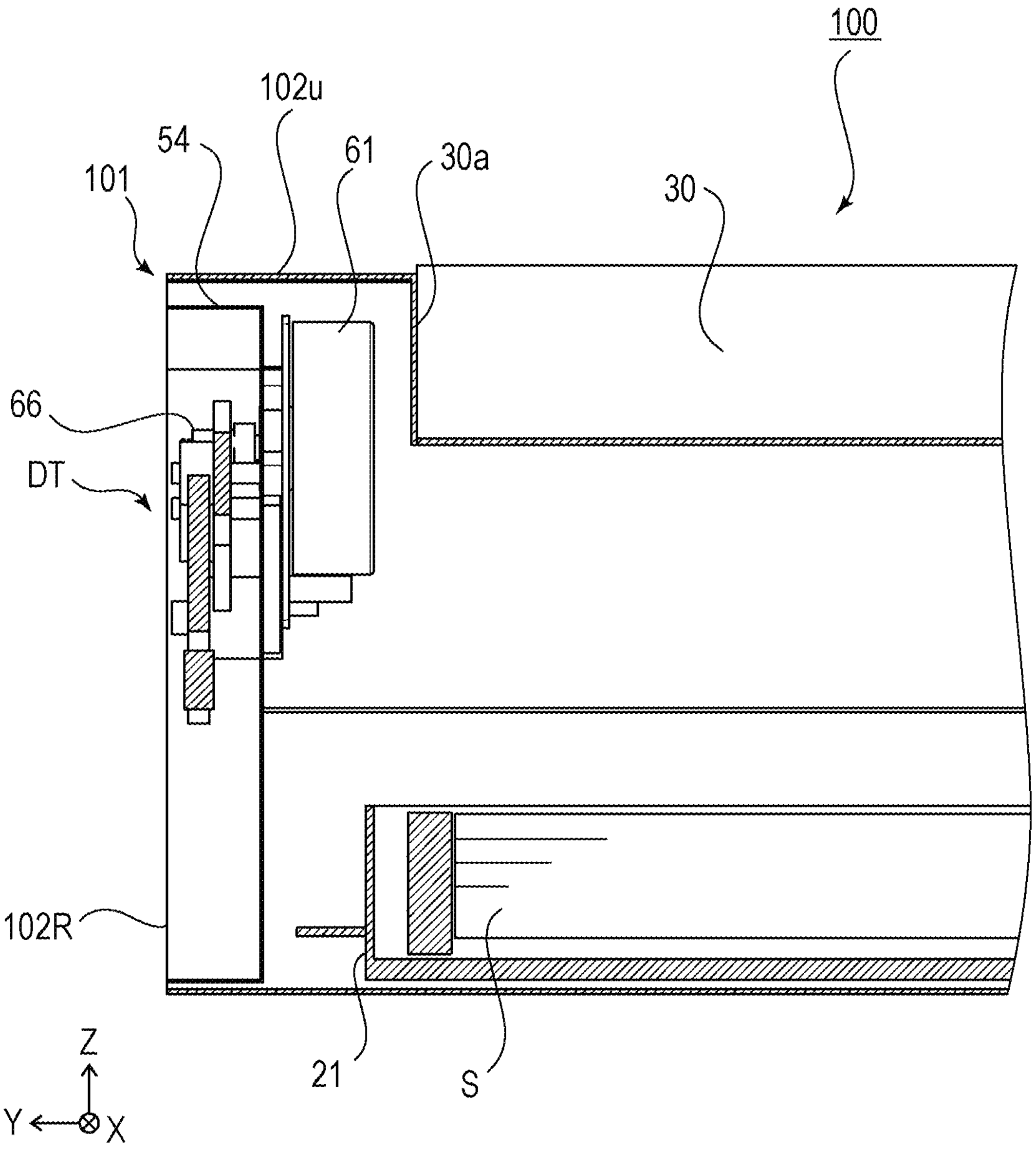
FIG. 7 illustrates the motor according to the first embodiment.

The motor 61 is disposed below the top surface 102*u* of the housing 102 and above the sheet tray 21 in the vertical direction (Z-axis direction) (FIG. 7). In addition, the motor 61 is disposed above the transfer conveyance frame 53 (FIG. 3).

The motor 61 is disposed between the two frame members that support the laser scanner 11 (that is, the front scanner stay 51 and rear scanner stay 52). More specifically, the motor 61 is disposed between the front scanner stay 51 and the rear scanner stay 52 in the front-rear direction (X-axis direction) of the image forming apparatus 100. As viewed in the X-axis direction, the motor 61 overlaps at least one of the front scanner stay 51 and the rear scanner stay 52 and preferably overlaps both. In addition, the motor 61 is disposed between the front scanner stay 51 and the rear scanner stay 52 in the mounting direction D2 of the process cartridge 10. As viewed in the mounting direction D2, the motor 61 is disposed so as to overlap at least one (preferably both) of the front scanner stay 51 (the first frame) and the rear scanner stay 52 (the second frame).

By disposing the motor 61 at a position that overlaps the front scanner stay 51 or the rear scanner stay 52 as viewed in the X-axis direction or the mounting direction D2, the image forming apparatus 100 can be more reduced in size. That is, the image forming apparatus 100 can be more reduced in size by using the space between the front scanner stay 51 and the rear scanner stay 52 to dispose the motor 61 on the inner side of the side plate 54 in the width direction (Y-axis direction).

For example, in a configuration in which the front scanner stay 51 and the rear scanner stay 52 are integrated into a single plate stay, the case where the motor 61 is disposed on the inner side of the side plate 54 is discussed below.

In this case, the motor 61 is disposed above or below the plate stay to ensure a space for the motor 61 and, thus, the size of the apparatus body 101 in the vertical direction may increase. According to the present embodiment, the motor 61 can be disposed so that the position of the motor 61 in the vertical direction (Z-axis direction) overlaps the positions of the front scanner stay 51 and the rear scanner stay 52 in the vertical direction (Z-axis direction) and, thus, the size of the image forming apparatus 100 in the vertical direction can be reduced.

As illustrated in FIG. 4B, the motor 61 according to the present embodiment is disposed in close proximity to the process cartridge 10 mounted in the apparatus body 101. As illustrated in FIG. 4A, a retraction shape 45 that matches the outline of the motor 61 is provided in the process cartridge 10. When the process cartridge 10 is mounted in the apparatus body 101, the retraction shape 45 can receive part of the motor 61. The retraction shape 45 is a shape in which the end surface of the process cartridge 10 in the width direction (Y-axis direction) at a first position in the mounting direction D2 is more retracted toward the center side (−Y side) of the process cartridge 10 than the end surface at a second position located upstream of the first position in the mounting direction D2. According to the present embodiment, an end surface 45*a* in the mounting direction D2 of a portion of the cleaning frame 42 that protrudes more than the side cover 10*a* is located closer to the center of the process cartridge 10 (on the more −Y side) than the end surface of the side cover 10*a* and, thus, the retraction shape 45 is formed. The above-described second position is, for example, a position where the length of the process cartridge 10 in the width direction (Y-axis direction) is maximized. The above-described first position is a position downstream of the second position in the mounting direction D2 and is a position in a region where the process cartridge 10 overlaps the motor 61 as viewed in the width direction (Y-axis direction) when the process cartridge 10 is mounted on the apparatus body 101.

By providing the retraction shape 45, contact between the process cartridge 10 and the motor 61 can be avoided even when the clearance between the two is reduced, which reduces the size of the image forming apparatus 100.

It is desirable that when the process cartridge 10 is mounted in the apparatus body 101, the motor 61 overlap part of the process cartridge 10 as viewed in the width direction (Y-axis direction) and overlap other part of the process cartridge 10 as viewed in the mounting direction D2. According to the present embodiment, as viewed in the width direction (Y-axis direction) with the process cartridge 10 mounted in the apparatus body 101, the motor 61 overlaps the cleaning frame 42 of the process cartridge 10. According to the present embodiment, when the process cartridge 10 is mounted in the apparatus body 101, the motor 61 overlaps the side cover 10*a* of the process cartridge 10 as viewed in the mounting direction D2. This arrangement of the motor 61 and the process cartridge 10 that overlap each other enables more size reduction of the image forming apparatus 100.

Figure 6:
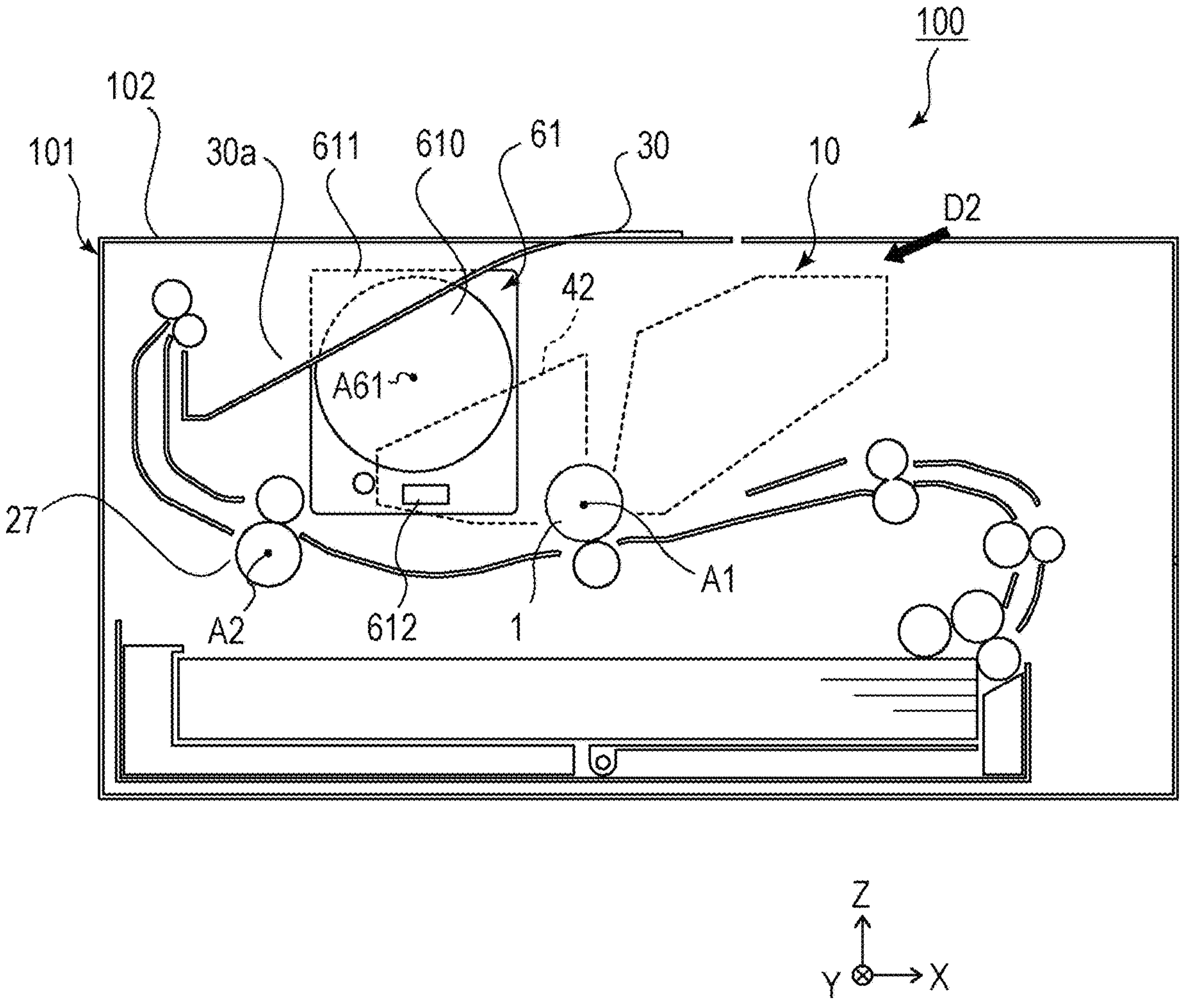
FIG. 6 illustrates the motor according to the first embodiment.

In addition, as illustrated in FIG. 6, the motor 61 is disposed so as not to overlap the development frame 46 of the process cartridge 10 as viewed in the width direction (Y-axis direction). Therefore, in a configuration in which the motor 61 is located in the vicinity of the process cartridge 10, it can be prevented that the width of the development frame 46 is reduced to avoid the motor 61, and as a result, the volume of a space for storing toner (the toner storage portion) in the development frame 46 is reduced. That is, the size of the image forming apparatus 100 can be reduced while ensuring the image quality and the toner capacity of the process cartridge 10 that has an impact on the number of sheets that can be printed using the process cartridge 10.

The positional relationship between the motor 61 and the side wall 30*a* of the housing 102 is described below with reference to FIGS. 6 and 7. FIG. 6 is a cross-sectional view of the image forming apparatus 100 cut by the X-Z plane. FIG. 7 is a cross-sectional view of the image forming apparatus 100 cut by the Y-Z plane.

The motor 61 is disposed so as to overlap the side wall 30*a* of the housing 102 as viewed in the width direction (Y-axis direction) (FIG. 6). That is, the motor 61 is disposed inside of the housing 102 so as to overlap the side wall 30*a* as viewed in the width direction. This arrangement allows the motor 61 to be disposed using the space behind the side wall 30*a* in the housing 102, thus reducing the size of the image forming apparatus 100.

That is, the present embodiment can provide an image forming apparatus that can be more reduced in size.

As described above, the motor 61 is disposed on the inner side of the side plate 54 in the width direction (Y-axis direction) (FIG. 7). More specifically, the motor 61 is disposed between the side wall 30*a* and the side plate 54 in the width direction (Y-axis direction). This configuration allows the motor 61 to be disposed by using the space between the side wall 30*a* and the side plate 54, thus reducing the size of the image forming apparatus 100. According to the present embodiment, at least part of the upper edge portion of the side plate 54 extends upward beyond the discharge tray 30 as viewed in the width direction (Y-axis direction). Part of the motor 61 is located between the portion of the side plate 54 that extends upward beyond the discharge tray 30 and the side wall 30*a*.

The motor 61 is disposed above the sheet tray 21 (the storage section) so as to overlap the sheet tray 21 (the storage section) as viewed in the vertical direction (Z-axis direction). This configuration allows the image forming apparatus 100 to be more reduced in size than, for example, when the motor 61 is disposed while avoiding the sheet tray 21 (storage section) in the X-axis or Y-axis direction.

Figure 8:
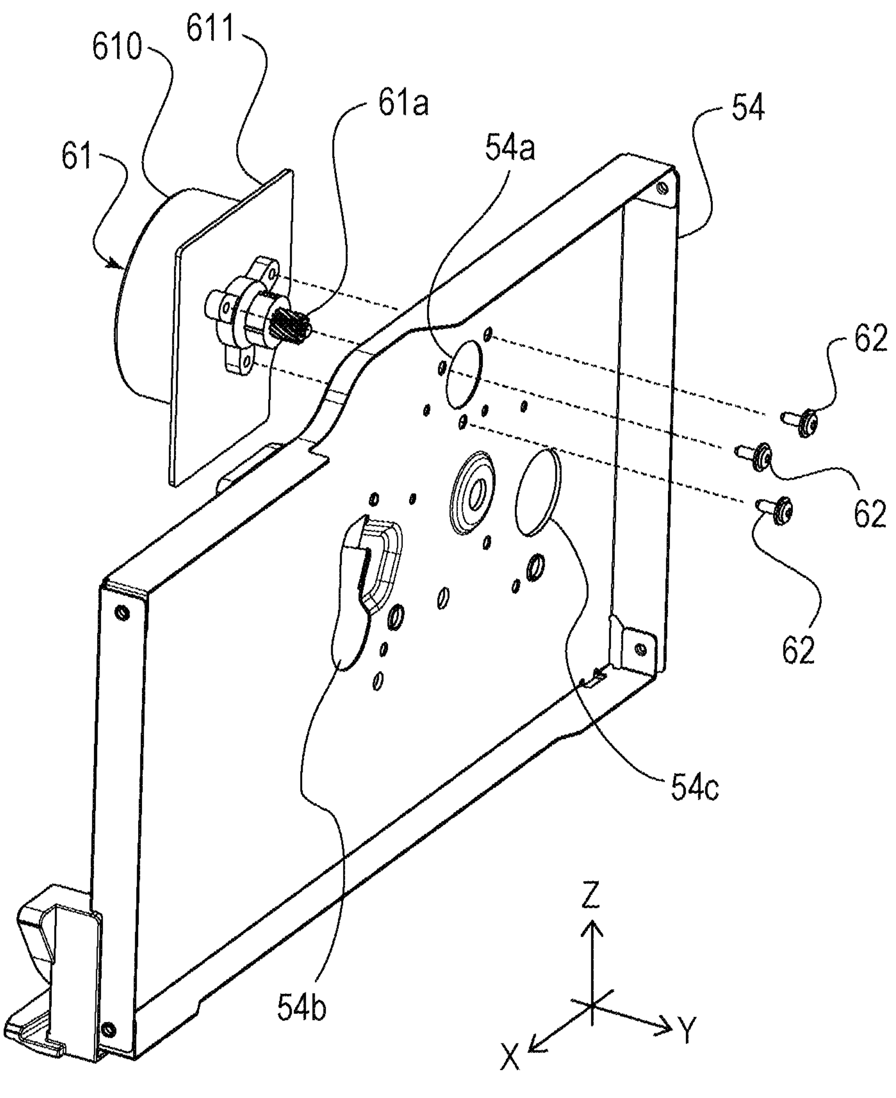
FIG. 8 illustrates the motor according to the first embodiment.

A method for mounting the motor 61 on the side plate 54 according to the present embodiment is described below with reference to FIG. 8. The motor 61 is secured to the side plate 54 using one or more fasteners (screws 62). Each of the screws 62 passes through a hole provided in the side plate 54 from the outside to the inside in the width direction (Y-axis direction) and is screwed into a screw hole provided in the mounting base 611.

The side plate 54 has a through-hole 54*a* that allows a pinion gear 61*a* (an output gear) of the motor 61 to pass therethrough. When the motor 61 is mounted on the side plate 54, the motor body 610 is located on the inner side of the side plate 54, and the pinion gear 61*a* is located on the outer side of the side plate 54.

Figure 9:
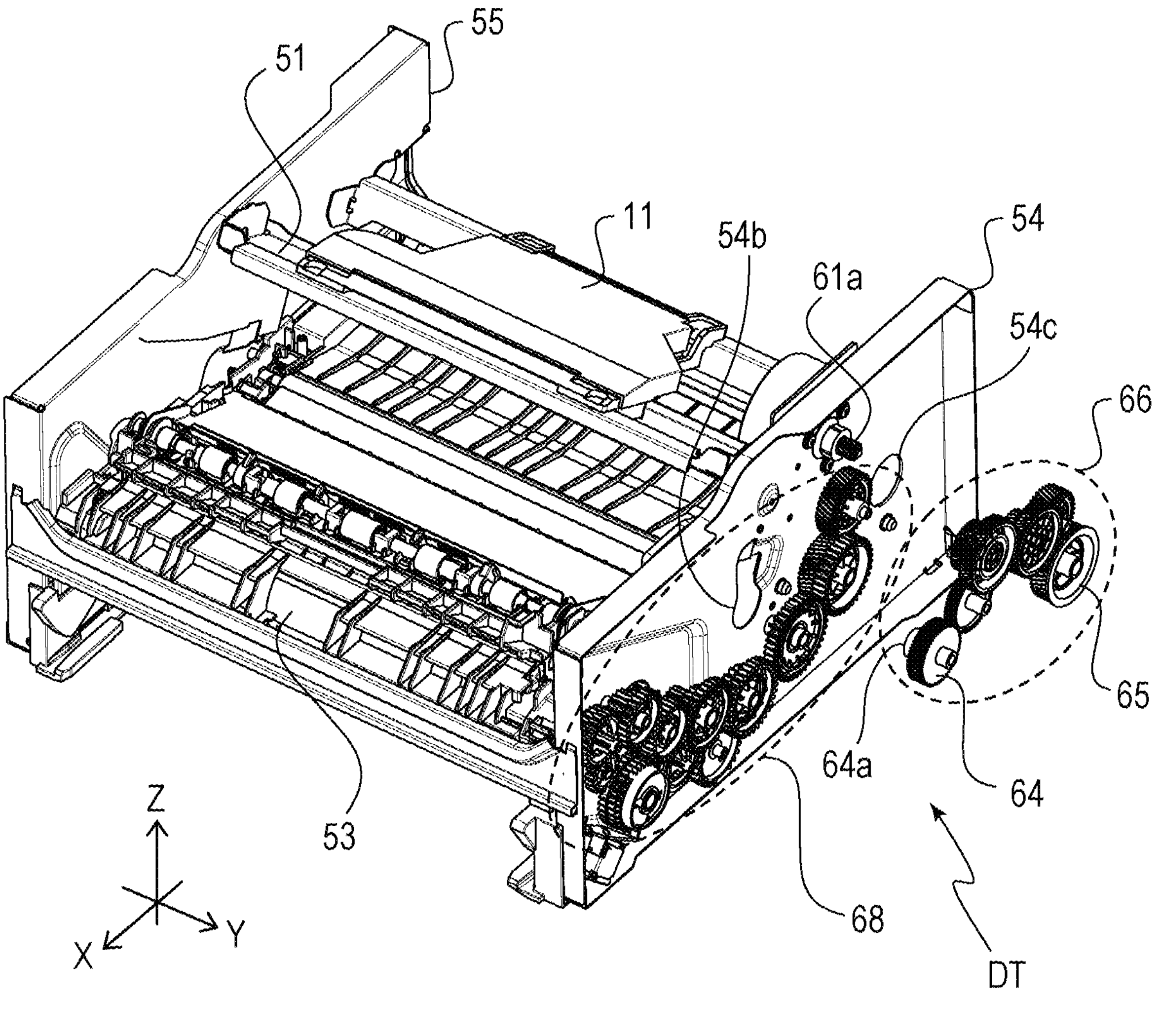
FIG. 9 illustrates the motor and a drive transmission mechanism according to the first embodiment.

FIG. 9 illustrates a drive transmission mechanism DT of the image forming apparatus 100 according to the present embodiment. The drive transmission mechanism DT transmits the driving force of the motor 61, which is a driving source, to a drive target included in the image forming apparatus 100. The drive transmission mechanism DT according to the present embodiment mainly includes a gear train consisting of a plurality of gears that mesh with each other.

The drive transmission mechanism DT according to the present embodiment includes a first gear train 66 serving as a drive transmission unit (a first drive transmission unit) that transmits the driving force received from the motor 61 to the photosensitive drum 1 and the pressure roller 27.

The drive transmission mechanism DT further includes a second gear train 68 serving as a second drive transmission unit that transmits the driving force of the motor 61 received via the first gear train 66 to the feeding unit 22 and other units.

The first gear train 66 includes a gear that meshes with the pinion gear 61*a*, a coupling gear 64 that outputs the driving force toward the process cartridge 10, and a pressure roller gear 65 that outputs the driving force to the fixing device 26.

The coupling gear 64 includes an output coupling 64*a* that engages with an input coupling 1*a* (FIG. 4A) of the process cartridge 10 when the process cartridge 10 is mounted in the apparatus body 101. The output coupling 64*a* protrudes inward from the side plate 54 through a through-hole 54*b* (FIG. 8) provided in the side plate 54. The output coupling 64*a* rotates about the rotational axis of the photosensitive drum 1 together with the photosensitive drum 1. When the process cartridge 10 is mounted, the coupling gear 64 rotates together with the photosensitive drum 1.

The pressure roller gear 65 meshes with an input gear provided at an end of the roller shaft of the pressure roller 27, for example. The input gear protrudes outward from the side plate 54 through a through-hole 54*c* (FIG. 8) provided in the side plate 54 and is disposed to mesh with the pressure roller gear 65 on the outer side of the side plate 54.

By providing the through-holes 54*b* and 54*c* as described above, drive transmission is enabled from the first gear train 66 located on the outer side of the side plate 54 to the photosensitive drum 1 and the pressure roller 27 located on the inner side of the side plate 54. It is desirable that the through-hole 54*a* that allows the pinion gear 61*a* to be inserted therethrough be disposed between the through-holes 54*b* and 54*c* corresponding to the photosensitive drum 1 and the pressure roller 27, respectively, in the X-axis direction. This configuration reduces fluctuations in the rotational speed of the photosensitive drum 1 and the pressure roller 27, as described below, and reduces a decrease in image quality.

As illustrated in FIGS. 7 and 9, the first gear train 66 is disposed in a space on the outer side of the side plate 54 and on the inner side of the right cover 102R, which is a right-side (+Y side) exterior member of the housing 102, in the width direction (Y-axis direction). The drive transmission mechanism DT is disposed in a space on the outer side of the side plate 54 and on the inner side of the right cover 102R, which is the right-side (+Y side) exterior member of the housing 102, in the width direction (Y-axis direction). By accommodating the first gear train 66 or the drive transmission mechanism DT in such a space, the image forming apparatus can be more reduced in size.

According to the present embodiment, the sheet conveyance path is formed so that the sheet S is conveyed in a substantially horizontal direction (X-axis direction) between the transfer portion Nt and the fixing portion Nf. That is, the image forming apparatus 200 has the so-called S-path layout. According to the S-path layout, as viewed in the width direction (Y-axis direction), the sheet S is conveyed toward one side (+X side) in the horizontal direction and, thereafter, an image is formed while the sheet S is being conveyed toward the other side (−X side) in the horizontal direction, and the sheet S is discharged toward the one side (+X side) in the horizontal direction.

The central axis A61 of the motor 61 is located between a rotational axis A1 of the photosensitive drum 1 and a rotational axis A2 of the pressure roller 27 in the horizontal direction (X-axis direction) along the sheet conveyance direction from the transfer portion Nt to the fixing portion Nf. This arrangement allows a reduction of the distance between the motor 61 serving as the drive source and each of the photosensitive drum 1 and pressure roller 27 serving as the driven members.

A small value of the above-described distance can reduce fluctuation of the rotational speed of the photosensitive drum 1 or the pressure roller 27 that occurs in the drive transmission unit (the first gear train 66) which transmits the driving force from the motor 61 to the photosensitive drum 1 and pressure roller 27. That is, fluctuation of the rotational speed that occurs in a meshing portion of gears decreases with decreasing number of gears that constitute the first gear train 66 and, thus, the fluctuation of the rotational speed of the photosensitive drum 1 or the pressure roller 27 that are the driven members can be reduced. As a result, degradation of the image quality (uneven density and the variation in magnification in the sub-scanning direction) caused by fluctuation of the rotational speed of the photosensitive drum 1 or the pressure roller 27 can be reduced.

The drive transmission unit is not limited to a gear train. For example, the drive transmission unit may include a belt transmission mechanism that transmits driving force using a belt. Even in such a case, if the distance between the motor 61 and each of the photosensitive drum 1 and the pressure roller 27 is small, fluctuations of the rotational speed of the photosensitive drum 1 or the pressure roller 27 due to, for example, belt expansion and contraction can be reduced, and the same advantages as in the first embodiment can be obtained.

Second Embodiment

An image forming apparatus according to the second embodiment is described below. Unlike the first embodiment, according to the present embodiment, a drive unit obtained by assembling a motor and a gear train into a unit in advance is mounted on the side plate. Hereinafter, elements labeled with the same reference numerals as in the first embodiment have basically the same configurations and operations as in the first embodiment unless otherwise specified, and differences from the first embodiment are mainly described.

Figure 10A:
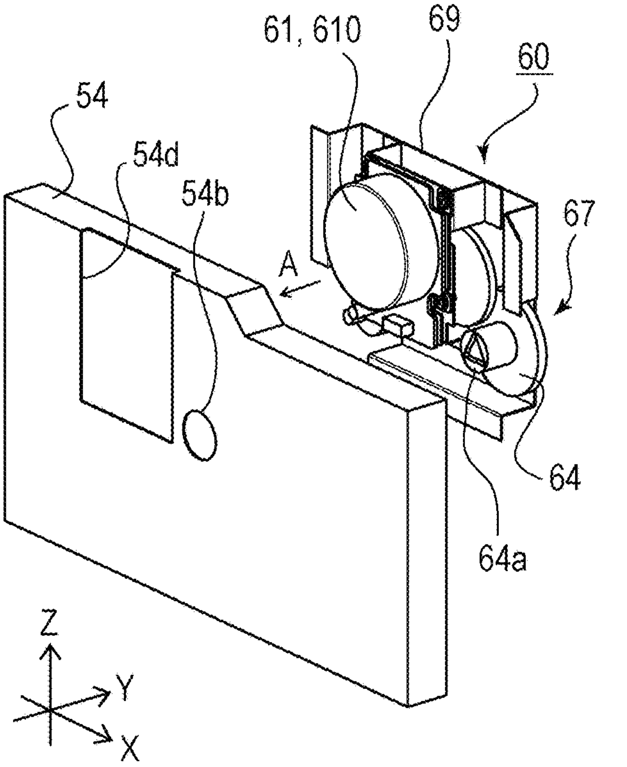
FIG. 10A illustrates a motor according to a second embodiment.
Figure 10B:
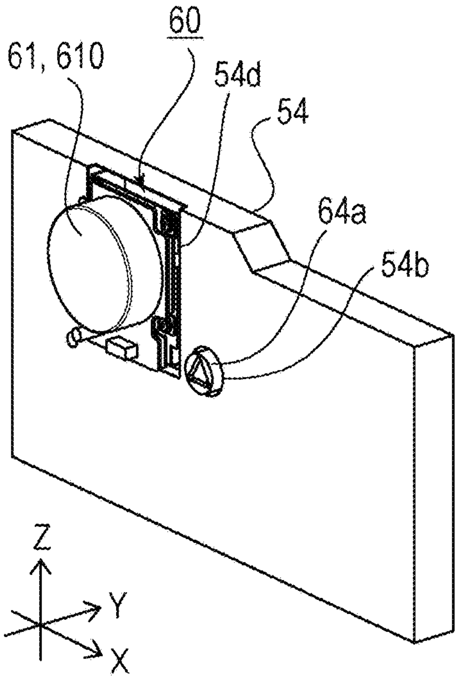
FIG. 10B illustrates the motor according to the second embodiment.

FIGS. 10A and 10B illustrate a method for mounting the motor 61 and the first gear train 66 according to the present embodiment. FIG. 10A illustrates a drive unit 60 removed from a side plate 54. FIG. 10B illustrates the drive unit 60 mounted on the side plate 54.

As illustrated in FIG. 10A, the drive unit 60 includes a motor 61, a gear train 67, and a support member 69 that supports the motor 61 and the gear train 67. The constituent elements of the gear train 67 correspond to the constituent elements of the first gear train 66 according to the first embodiment. The support member 69 includes two metal plates that sandwich the gear train 67 from one side and the other side in the width direction (Y-axis direction). The motor 61 is mounted on the support member 69 so that the pinion gear 61*a* (FIG. 8) faces outward in the width direction (Y-axis direction). The drive unit 60 is assembled in advance so that the motor 61 is mounted on the support member 69, and the gear train 67 is held by the support member 69.

As illustrated in FIGS. 10A and 10B, the drive unit 60 is mounted on the side plate 54 from the outside toward the inside in the width direction (Y-axis direction) (arrow A) and is fixed to the side plate 54 using a screw or the like. The drive unit 60 is mounted so that the motor body 610 and the output coupling 64*a* protrude into the inner side of the side plate 54 through an opening 54*d* and the through-hole 54*b* of the side plate 54.

When the drive unit 60 is mounted on the side plate 54, the positional relationship among the motor 61, the side wall 30*a*, the laser scanner 11, the sheet tray 21, the process cartridge 10, and the like is the same as according to the first embodiment. For example, the motor 61 is disposed so as to overlap the side wall 30*a* of the housing 102 as viewed in the width direction (Y-axis direction) (FIG. 6).

Even such a configuration can provide the same advantages as according to the first embodiment. That is, the present embodiment can provide an image forming apparatus that can be more reduced in size. In addition, according to the present embodiment, since the motor 61 and gear train 67 are assembled into a unit in advance, the workability of assembly can be improved.

The drive unit 60 may include gears equivalent to some or all of the gears of the second gear train 68 of the first embodiment, in addition to the gear train 67 corresponding to the first gear train 66 of the first embodiment. The drive unit 60 may include gears for transmitting driving force to the discharge roller pair 29 and an actuator other than the motor 61.

Third Embodiment

An image forming apparatus according to the third embodiment is described below. According to the present embodiment, the layout of the sheet conveyance path inside of the image forming apparatus differs from that according to the first embodiment. Hereinafter, elements labeled with the same reference numerals as in the first embodiment have basically the same configurations and operations as in the first embodiment unless otherwise specified, and differences from the first embodiment are mainly described.

Figure 11:
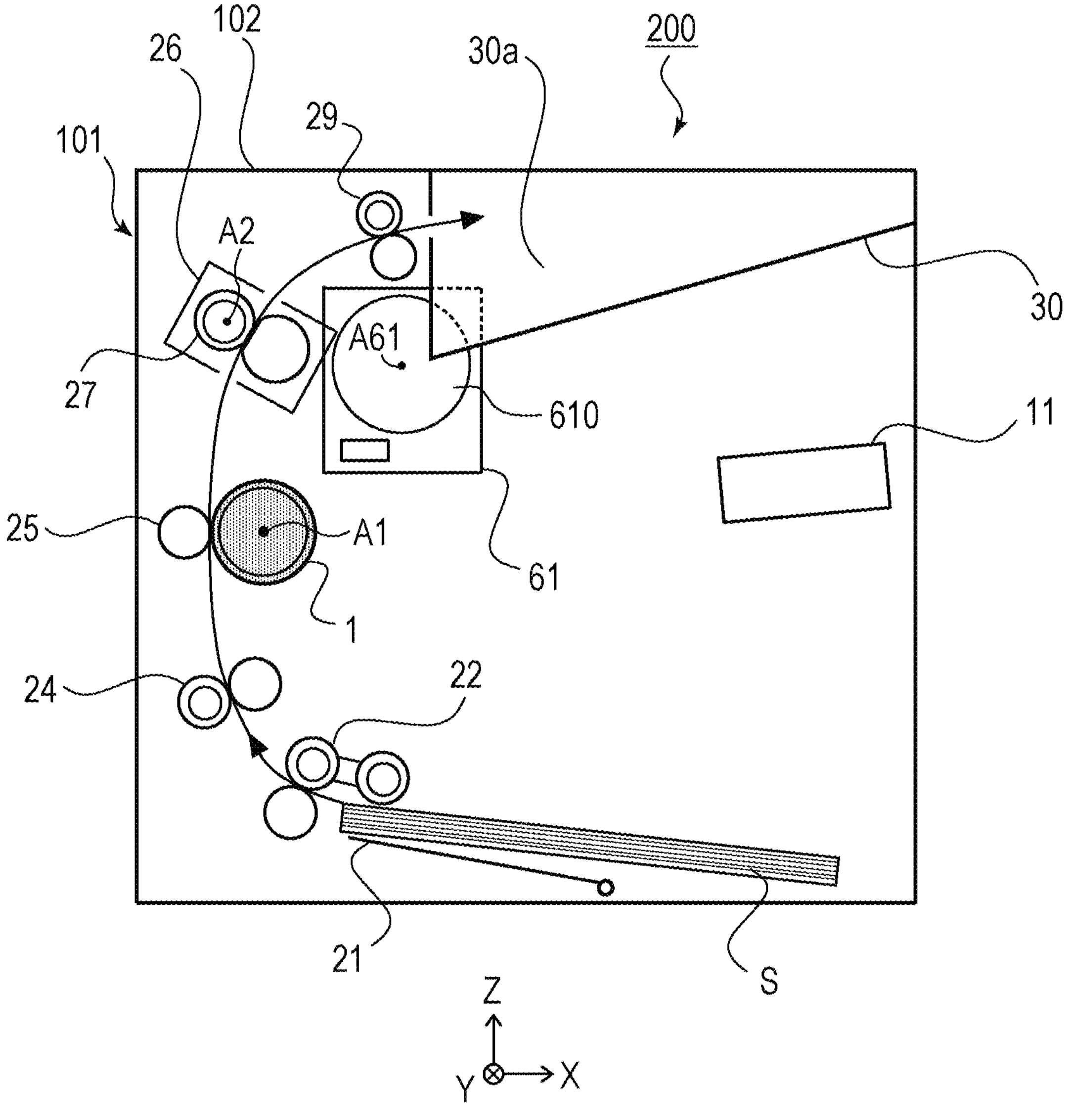
FIG. 11 is a schematic illustration of an image forming apparatus according to a third embodiment.

FIG. 11 is a schematic illustration of the X-Z cross section of an image forming apparatus 200 according to the third embodiment. The image forming apparatus 100 includes an apparatus body 101, a process cartridge including a photosensitive drum 1 (not illustrated), and a sheet tray 21. The apparatus body 101 includes a housing 102, a feeding unit 22 held in the housing 102, a laser scanner 11, a conveyance roller pair 24, a transfer roller 25, a fixing device 26, a discharge roller pair 29, and a motor 61. A discharge tray 30 and a side wall 30*a* are provided in a top surface portion of the housing 102.

According to the present embodiment, a sheet conveyance path is formed so that a sheet S is conveyed in a substantially vertical direction (Z-axis direction) from the transfer portion Nt to the fixing portion Nf. That is, the image forming apparatus 200 has the so-called C-path layout. According to the C-path layout, as viewed in the width direction (Y-axis direction), the sheet S is conveyed toward one side (−X side) in the horizontal direction and, thereafter, an image is formed while the sheet S is being conveyed upward, and the sheet S is discharged toward the other side (+X side) in the horizontal direction. In addition, as viewed in the vertical direction (Z-axis direction), the discharge tray 30 and the sheet tray 21 overlap each other.

The motor 61 drives a photosensitive drum 1 and a pressure roller 27. According to the present embodiment, the motor 61 is also disposed so as to overlap the side wall 30*a* of the housing 102 as viewed in the width direction (Y-axis direction) (FIG. 6). Like the first embodiment, the motor 61 is disposed on the outer side of the side wall 30*a* and on the inner side of the side plate of the housing 102. A drive transmission unit (corresponding to the first gear train 66 according to the first embodiment) that transmits the driving force from the motor 61 to the photosensitive drum 1 and the pressure roller 27 is disposed on the outer side of the side plate 54.

Therefore, the same advantages as in the first embodiment can be obtained with the arrangement according to the present embodiment. That is, the present embodiment can provide an image forming apparatus that can be reduced in size.

According to the present embodiment, the central axis A61 of the motor 61 is located between the rotational axis A1 of the photosensitive drum 1 and the rotational axis A2 of the pressure roller 27 in the vertical direction (Z-axis direction) along the sheet conveyance direction from the transfer portion Nt to the fixing portion Nf. This arrangement allows reduction in the distance between the motor 61, which is the drive source, and each of the photosensitive drum 1 and pressure roller 27, which are driven members. This configuration can reduce a decrease in image quality (uneven density and magnification variation in the sub-scanning direction) caused by fluctuations in the rotational speed of the photosensitive drum 1 or the pressure roller 27.

Other Embodiments

While the embodiments above have been described with reference to the image forming apparatus including only one process cartridge 10 as an example, the technology of the present disclosure is not limited thereto. The image forming apparatus may include a plurality of cartridges each being removable from the apparatus body 101. The plurality of cartridges are not limited to process cartridges, but may also be a developing cartridge corresponding to the developing unit 40 or a toner cartridge containing developer (toner) to be supplied.

The configuration of the process cartridge 10 is not limited to that according to the first embodiment. The process cartridge 10 may include a photosensitive drum 1 and any one of the charging unit, the developing unit, and the cleaning unit that operates for the photosensitive drum 1.

Instead of including the process cartridge 10 that is removable from the apparatus body 101 by the user, the image forming apparatus may include an image forming unit that is built into the apparatus body 101 so that the user cannot remove it by themselves.

The image forming apparatus may include a plurality of image forming units to form a color image using toner of a plurality of colors. The image forming apparatus may include a plurality of motors each corresponding to one of the plurality of image forming units. In this case, it is desirable that at least one of the motors be disposed so as to overlap the side wall 30*a* as viewed in the width direction (Y-axis direction).

The image forming apparatus is not limited to a single-function printer with only an image forming function (a print function), but may be a copying machine, a facsimile machine, or a multifunction printer.

According to the present disclosure, it is possible to provide an image forming apparatus that can be more reduced in size.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-159238 filed Sep. 22, 2023 and No. 2023-122711 filed Jul. 27, 2023, which are hereby incorporated by reference herein in their entirety.

What is claimed is:

1. An image forming apparatus comprising:
- a housing configured to accommodate an image forming unit that forms an image on a recording material;
- a discharge unit including a roller and configured to discharge the recording material to an outside of the housing; and
- a motor disposed inside of the housing and configured to drive the image forming unit,
- wherein the housing includes:
  - a stacking unit on which the recording material discharged by the discharge unit is stacked, and
  - a wall surface provided at an end of the stacking unit in a width direction that is perpendicular to both a vertical direction and a discharge direction of the discharge unit, and the wall surface extends upward beyond the stacking unit, and
- wherein the motor is disposed at a position that overlaps the wall surface as viewed in the width direction.

2. The image forming apparatus according to claim 1, wherein the housing includes a first side plate that intersects the width direction,
- wherein the motor is supported by the first side plate and is disposed on an inner side of the first side plate in the width direction.

3. The image forming apparatus according to claim 2, further comprising:
- a drive transmission unit configured to transmit driving force from the motor to the image forming unit,
- wherein the drive transmission unit is disposed on an outer side of the first side plate in the width direction.

4. The image forming apparatus according to claim 2, wherein the image forming unit is configured to be removable from the housing,
- wherein the housing includes a second side plate that intersects the width direction, and
- wherein a space in which the image forming unit is mounted is formed between the first side plate and the second side plate in the width direction.

5. The image forming apparatus according to claim 4, wherein when the image forming unit is mounted in the housing, the motor overlaps the image forming unit as viewed in the width direction, and the motor overlaps the image forming unit as viewed in a mounting direction in which the image forming unit is mounted to the housing.

6. The image forming apparatus according to claim 5, wherein the image forming unit includes a development frame configured to store a developing agent, and wherein when the image forming unit is mounted in the housing, the motor does not overlap the development frame as viewed in the width direction.

7. The image forming apparatus according to claim 5, wherein the image forming unit has a shape in which an end surface of the image forming unit in the width direction at a first position in the mounting direction is more retracted toward a center side of the image forming unit in the width direction than the end surface of the image forming unit at a second position located upstream of the first position in the mounting direction.

8. The image forming apparatus according to claim 4, further comprising:

an exposure device configured to emit light onto a photosensitive drum of the image forming unit for exposure, wherein the housing includes a first frame and a second frame each connected to the first side plate and the second side plate to support the exposure device, the first and second frames being disposed apart from each other in a mounting direction of the image forming unit, and wherein the motor is disposed between the first frame and the second frame in the mounting direction.

9. The image forming apparatus according to claim 8, wherein the motor overlaps at least one of the first frame or the second frame as viewed in the mounting direction.

10. The image forming apparatus according to claim 8, wherein a protruded portion is provided on a bottom surface portion of the exposure device so as to protrude downward beyond a top surface of the first frame and a top surface of the second frame through a space between the first frame and the second frame, and wherein a recess is provided on a top surface portion of the image forming unit so as to be recessed downward and face the protruded portion.

11. The image forming apparatus according to claim 1, further comprising:

an exposure device configured to emit light onto a photosensitive drum of the image forming unit for exposure, wherein the housing includes a first side plate that intersects the width direction, a second side plate that intersects the width direction and faces the first side plate in the width direction, and a first frame and the second frame each connected to the first side plate and the second side plate, wherein the first frame and the second frame support the exposure device and are disposed apart from each other in a horizontal direction that intersects both the vertical direction and the width direction, and wherein the motor is disposed between the first frame and the second frame in the horizontal direction.

12. The image forming apparatus according to claim 1, further comprising:

a storage section configured to store a recording material, wherein the motor is disposed at a position that overlaps the storage section as viewed in the vertical direction.

13. The image forming apparatus according to claim 1, further comprising:

a transfer member configured to form, together with a photosensitive drum of the image forming unit, a transfer portion in which a toner image is transferred from the photosensitive drum to the recording material; and a fixing device including a heating member, a heating unit configured to heat the heating member, and a pressure member that forms a fixing portion together with the heating member, wherein the fixing device heats the toner image by using the heating member while conveying the recording material in the fixing portion, and wherein the motor rotatingly drives the photosensitive drum and one of the heating member or the pressure member.

14. The image forming apparatus according to claim 13, wherein in a horizontal direction along a conveyance direction of the recording material from the transfer portion to the fixing portion, a central axis of the motor is located between a rotational axis of the photosensitive drum and a rotational axis of the one of the heating member or the pressure member.

* * * * *